June 13, 1939. E. R. HACMAC 2,162,348
LIQUID DISPENSER AND MIXER
Filed Oct. 21, 1938
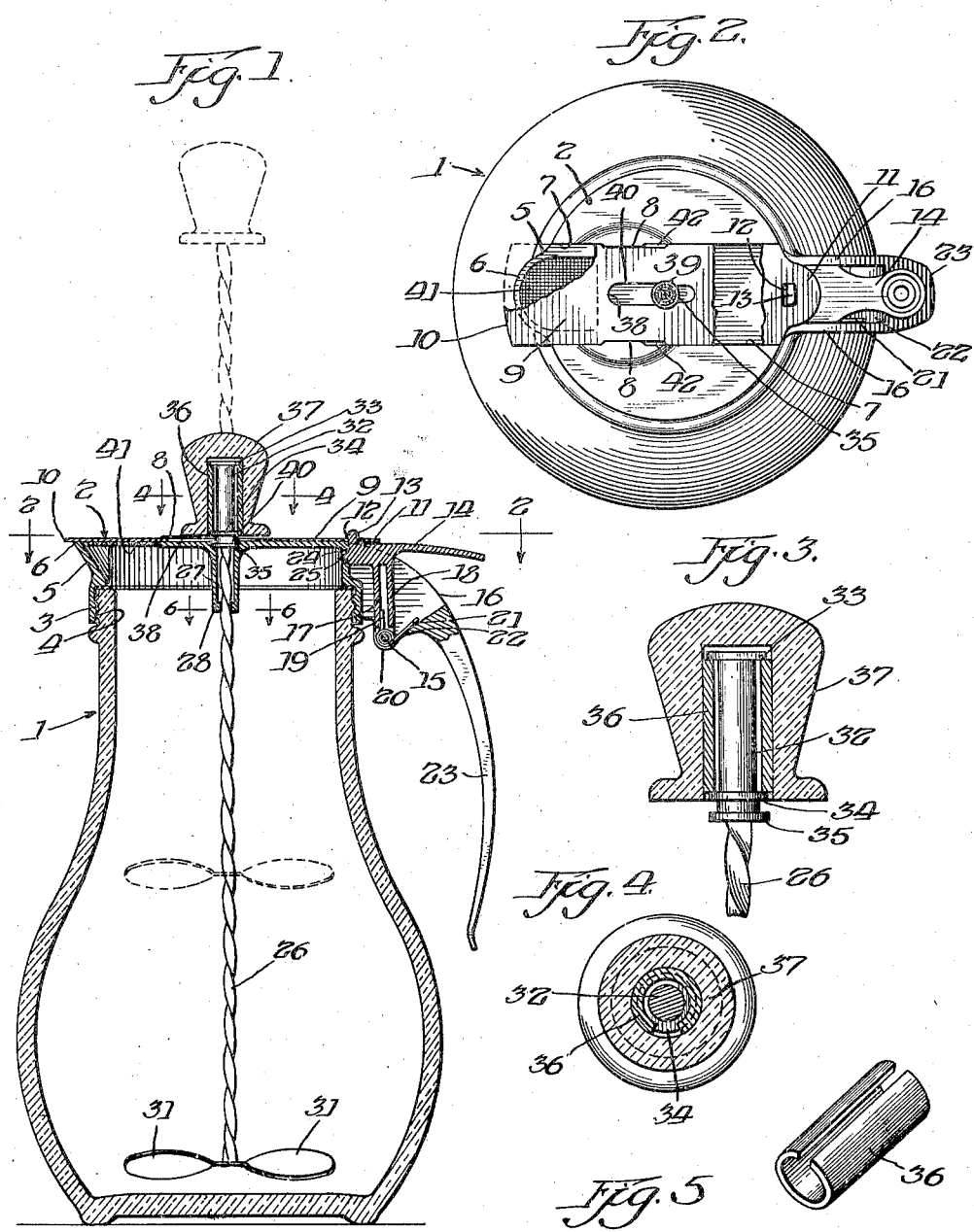
INVENTOR.
Edward Richard Hacmac
BY Parkinson & Lane
ATTORNEY.

Patented June 13, 1939

2,162,348

UNITED STATES PATENT OFFICE 2,162,348

LIQUID DISPENSER AND MIXER

Edward Richard Hacmac, Hollywood, Calif., assignor to Na-Mac Products Company, a corporation of California Application October 21, 1938, Serial No. 236,131

3 Claims. (Cl. 259—117)

My invention relates to a liquid dispenser and mixer and more particularly to a device which will thoroughly mix the ingredients of a container and dispense the mixture without dripping.

An object of the present invention is to provide a dripless container in which ingredients may be thoroughly mixed without shaking the container and contents and without the necessity of removing the mixing device before pouring. The device is also adapted for use in mixing and dispensing foods such as waffle batter, etc.

It is a further object of my invention to provide a simplified form of mixing device in the form of a propeller having a plurality of blades angularly disposed to each other, said propeller being revolvable and vertically reciprocal so as to effect a thorough mixing of all parts of the contents of the container and to provide a simplified, easily operable and efficient means for operating said mixing device.

Other objects are to provide a novel construction for freely and rotatably attaching a knob or handle to the mixing apparatus; for mounting this apparatus in the top of the device so as not to interfere with the operation of the closure and drip shearing device; and for providing a locking means for the mixing device to prevent its movement during pouring of the container contents.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangements of parts illustrated in the accompanying drawing, and while I have shown therein a preferred embodiment, it is to be understood that the same is susceptible of modification and change, and comprehends other details, arrangements of parts, features and constructions without departing from the spirit of the invention.

In the drawing:

Fig. 1 is a side view in vertical cross section of an embodiment of my device.

Fig. 2 is a top horizontal cross sectional view taken on the line 2—2 of Fig. 1.

Fig. 3 is a fragmentary enlarged vertical cross sectional view of the handle operating the mixing device.

Fig. 4 is a horizontal cross sectional view of the handle and taken on the line 4—4 of Fig. 1.

Fig. 5 is a perspective view of the bearing in the handle, and

Fig. 6 is a horizontal cross sectional view taken on the line 6—6 of Fig. 1 of the mixing shaft and bearing in the container top therefor.

Referring more particularly to the disclosure of the embodiment shown in the drawing, my invention comprises a bottle or container 1 having a cover 2 detachably connected thereto in any suitable manner such as the threads 3 formed on the interior of the cover 2 and complementary threads 4 on the neck of the bottle.

The cover 2 at one edge is formed with a dispensing or pouring spout 5 having an outer arcuate lip 6. Located centrally in the cover is a guideway or channel 7 aligned with the lip and provided adjacent its forward end with inwardly projecting lugs 8, 8, adapted to form retaining and guiding members for a slidable shearing member 9. This shearing member is of relatively thin and resilient metal and forms a movable or slidable shearing element which closely contacts the upper edge of the spout and co-acts therewith to shear off and forcibly hurl or propel the residue or final part of the sheared flow away from the spout and thereby eliminate or prevent dripping. In order to accomplish this novel function and result, the invention comprehends forming the spout with relatively thin walls with the width of the blade or slidable shearing member 9 slightly greater than the width or cross section of the spout opening, and the curvature of the shearing edge 10 of the blade having a greater radius than the radius of the arcuate edge or lip 6 of the spout and formed with a flatter arc. Thus as the blade 9 is quickly and forcibly moved or shot across the upper edge of the discharge spout which forms the stationary shearing member, it first shears the dispensed liquid adjacent the opposite sides of the passage and next at the extreme forward edge of the arcuate lip, thereby concentrating or collecting the final flow or globule of the dispensed liquid at the extreme forward edge of this lip, and as the shearing edge 10 of the blade extends beyond the lip, the rapid movement of the propelled blade cleanly shears the liquid and hurls or propels it away from the spout.

In order to rapidly propel or shoot the blade or shearing element 9 across the spout or stationary shearing member in tight shearing relation therewith, the rear end 11 of the blade which is slightly bent, is provided with a slot 12 for receiving a lug or upward projection 13 on the trigger or lever 14 pivotally mounted upon a pin 15 spanning a bifurcated bracket or extension 16 of the closure. This trigger or lever 14 is provided with spaced extensions 17 and 18 providing a slot for the reception of one end 19 of a coil spring 20 mounted upon the pin 15, with the other end 21 of the spring bearing against the web 22 of the bracket or extension 16. To this bracket is detachably secured a handle 23.

To insure that the liquid flows as freely as possible through the discharge spout, the closure is provided with an opening or vent 24. Since it is extremely important that the vent be opened and maintained open during pouring, I provide a pointed or tapered projection 25 formed or provided on the trigger or lever and aligned with the vent 24 so as to enter the latter when the trigger is released. This projection insures against clogging of the vent of any obstruction or film of the liquid which would tend to collect therein and clog the opening.

In the operation of the device, downward pressure applied to the trigger or lever 14 retracts the resilient blade against the compression of the spring 20. This spring being quite heavy and tending at all times to move the blade into its closed or shearing position, it will be evident that removal of the pressure from the trigger will permit the heavy spring to propel or shoot the blade or slidable shearing member onto and across the spout, shearing and hurling the last vestige of the liquid away from the spout. By the present arrangement of the blade, guideway or channel, lugs and incline of the upper surface of the spout, the resilient outer end of the blade or slidable shearing member will be flexed by the lugs and maintained in close contact with the upper surface of the spout and stationary shearing edge, so as to insure a clean cut-off or shearing of the dispensed liquid, and by extending the end of the blade or shearing member 9 beyond the outer edge of the spout, the last trace of the discharged liquid will be forcibly projected or hurled away from the spout.

The cover is provided, preferably integrally, with a central downwardly extending bearing or boss having a central opening 27 therethrough. In this bearing or boss is a spiral driving shaft 26 so mounted as to be adapted to vertical reciprocatory movement. The boss or bearing is provided with inwardly extending projections 28 which when the shaft is reciprocated coact with the shaft to cause the shaft to concomitantly rotate. Fixedly mounted on the lower end of the drive shaft is a mixing device comprising a plurality of blades 31. When the shaft is reciprocated in the boss or bearing the mixing blades are caused to concomitantly rotate. The speed of rotation depends on the speed with which the shaft is reciprocated in the bearing. If it is desired to stir the contents slowly the shaft may be reciprocated slowly; if it is desired to give the contents a quick, fast mix, the shaft is rapidly reciprocated.

At its upper end the shaft is enlarged and circular in cross section at 32 and provided with a handle for vertically reciprocating the driving shaft in the container. Means are provided for a loose connection between the shaft and handle so that the latter will not turn in the hand of the user or operator and for locking the mixing apparatus in the container. These means comprise spaced annular beads or flanges 33, 34 and 35 on the upper part 32 of the shaft, the beads 33 and 34 providing stops or abutments for the opposite ends of a split sleeve 36 which is suitably pressed into a well in the handle or knob 37. This knob or handle 37 may be made of a plastic, wood or other suitable material. When the handle is raised and lowered it will carry the shaft with it. The shaft will rotate because of the coaction between it and the opening in the bearing member thereby causing rotation of the blades 31 to agitate the fluid in all parts of the container.

To lock the mixing apparatus during pouring of the contents from the container, I provide elongated slot 38 in the closure shearing member 9 to accommodate the shaft 26 but permitting reciprocatory back and forth movement of the shearing member. This slot has a widened portion 39 near its rear end, and through which the shaft will extend when the closure shearing member 9 is in its closed position, in order to accommodate the bead 35 which is adapted to rest in widened portion or well 40 in the upper part of opening 27 in the top of the bearing or boss. The remaining portion of the slot is not wide enough to accommodate the bead 35. Consequently, when the shaft is lowered and the bead 35 is in the opening 40, which is the position the shaft will drop to when the handle is released, the closure shearing member 9 may be freely moved back and forth but, when the container is raised and the member 9 drawn back for pouring, the narrow portion of the slot 40 will be above the bead 35 and prevent it from moving out of the well 40 whereby the shaft will be locked in place and prevented from coming out of the container to interfere with the pouring. The slot 38 is of such length that it will contact the shaft 26 and prevent further backward movement of the blade 9 when the opening is sufficiently wide to permit passage of the fluid but not of the undesirable parts of the contents of the container. A strainer is not therefore usually required, but the spout 5 may be equipped with one if desired, as shown at 41.

The blade 9 is provided with recesses 42 so that it may be readily removed for cleaning it and the channel 7. By lifting the rear end 11 of the blade from the lug 13, the blade may be pushed forward until the recesses 42 register with the lugs 8 when the blade may be raised.

In operation the cover and associated parts are removed and the container filled with the ingredients to be mixed. The cover is then replaced and the mixing device is operated by vertical reciprocation of the handle or knob which causes the shaft to carry the rotating beaters from top to bottom of the container to thoroughly mix the contents in all parts thereof. After the mixing has been completed and it is desired to pour the contents from the container, it is grasped by the handle 23, the thumb of the operator pressing on the trigger 14 to pull back the member 9 to open the spout. This backward movement of the member 9 locks the operating mechanism in the container as explained above. Upon release of the trigger, the member 9 closes the spout and shears off any liquid thereon to prevent dripping therefrom as heretofore explained.

It will be at once apparent that my invention is adaptable for a large number of other uses such as beating eggs, mixing waffle batter and any other use where mixing of liquids, either light or heavy, is necessary.

Having thus disclosed the invention, I claim:

1. In a device of the kind described, a fluid container having a cover and spout, a movable closure for said spout, a shaft extending through said closure and cover, means in the cover for rotating said shaft, means on the shaft for agitating the fluid, and cooperating parts on the shaft and closure for locking the shaft against longitudinal movement when the closure is removed from the spout.

2. In a device of the kind described, a fluid container having a cover and spout, a movable closure for said spout, a shaft extending through said spout, means in the cover for rotating said shaft, means on the shaft for agitating the fluid, and means for locking the shaft against longitudinal movement when the closure is removed from the spout.

3. In a device of the type described, a container, a cover therefor and having a pouring spout therein, a closure for said spout and mounted for reciprocatory movement on said cover, a slot therein, an enlargement in the slot, a mixing device having a shaft mounted in the cover and extending through the slot, a flange on the shaft adapted to be received by the enlargement on the slot, the rest of the slot being narrower than the enlargement so as to form an abutment therefor to prevent movement of the shaft when the closure is moved to open the slot.

EDWARD RICHARD HACMAC.